United States Patent
Stephan

(10) Patent No.: US 7,875,333 B2
(45) Date of Patent: Jan. 25, 2011

(54) LAMINATE SHEET, IN PARTICULAR FOR FUSELAGE SKIN SHEETS FOR AIRCRAFTS

(75) Inventor: Andreas Stephan, Fredenbeck (DE)

(73) Assignee: Airbus Deutschland GmbH, Hamburg (DE)

( * ) Notice: Subject to any disclaimer, the term of this patent is extended or adjusted under 35 U.S.C. 154(b) by 368 days.

(21) Appl. No.: 12/126,173

(22) Filed: May 23, 2008

(65) Prior Publication Data

US 2008/0292849 A1 Nov. 27, 2008

Related U.S. Application Data

(60) Provisional application No. 60/939,706, filed on May 23, 2007.

(30) Foreign Application Priority Data

May 23, 2007 (DE) .............. 10 2007 024 368
Sep. 28, 2007 (DE) .............. 10 2007 046 478

(51) Int. Cl.
*B32B 3/10* (2006.01)
(52) U.S. Cl. .............. 428/60; 428/189; 244/120; 244/131

(58) Field of Classification Search .......... 428/60, 428/614, 608, 189; 244/120, 131; 403/265, 403/270; 156/304.1
See application file for complete search history.

(56) References Cited

U.S. PATENT DOCUMENTS

| 4,156,054 | A | 5/1979 | Gurewitsch |
| 5,160,771 | A | 11/1992 | Lambing et al. |
| 6,479,124 | B1 | 11/2002 | Porte et al. |
| 6,736,919 | B1 | 5/2004 | Roebroeks |
| 7,115,323 | B2 * | 10/2006 | Westre et al. ......... 428/593 |

FOREIGN PATENT DOCUMENTS

| DE | 78 21340 | 7/1979 |
| DE | 698 08 903 | 8/2003 |
| DE | 698 23 798 | 4/2005 |
| EP | 1 504 888 | 2/2005 |

* cited by examiner

*Primary Examiner*—Alexander Thomas
(74) *Attorney, Agent, or Firm*—Occhiuti Rohlicek & Tsao LLP

(57) ABSTRACT

A laminate sheet, in particular for use as a fuselage skin includes thin aluminium alloy sheets layered on top of one another with each two aluminium alloy sheets being adhesively bonded to one another at least in regions by an adhesive layer which includes at least one unidirectional fibreglass insert impregnated with a curable synthetic resin.

7 Claims, 5 Drawing Sheets

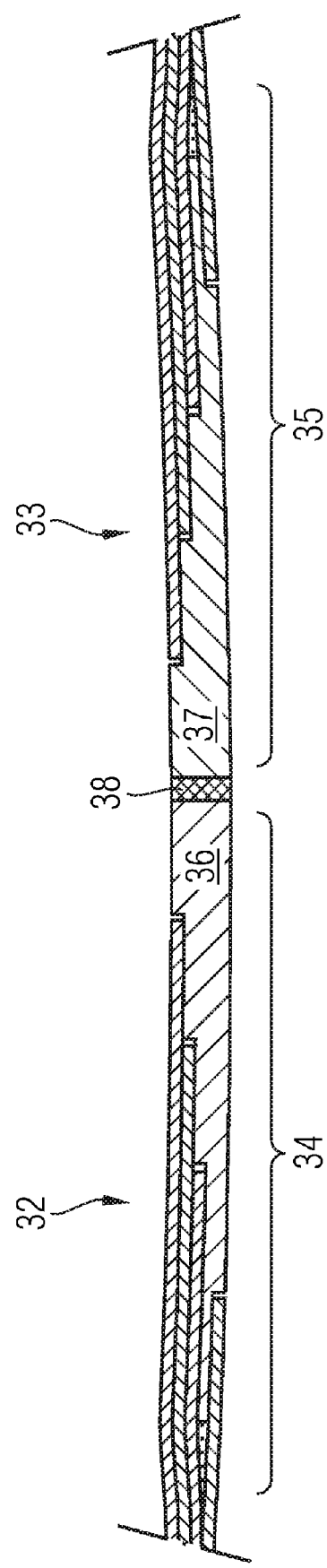

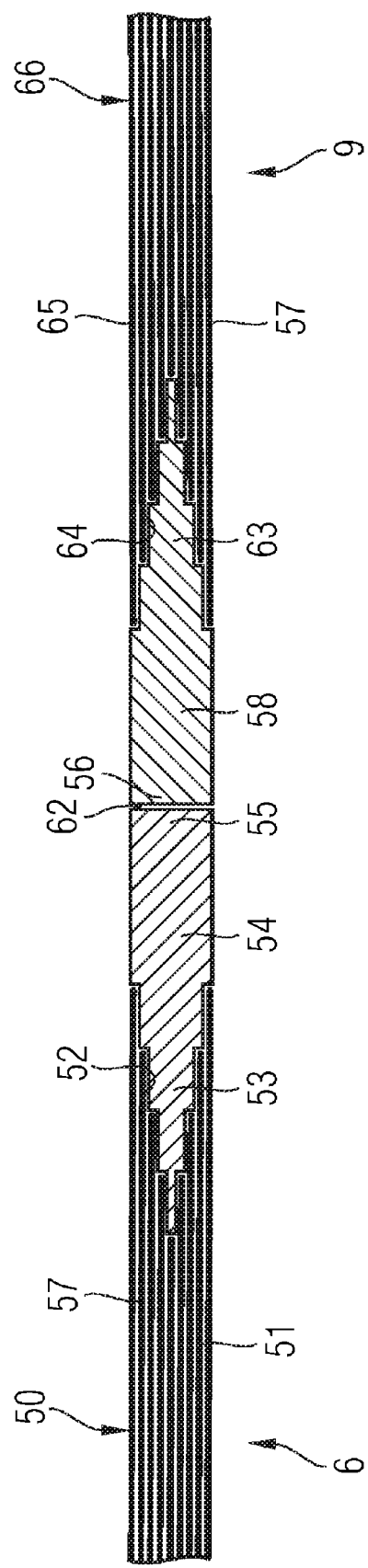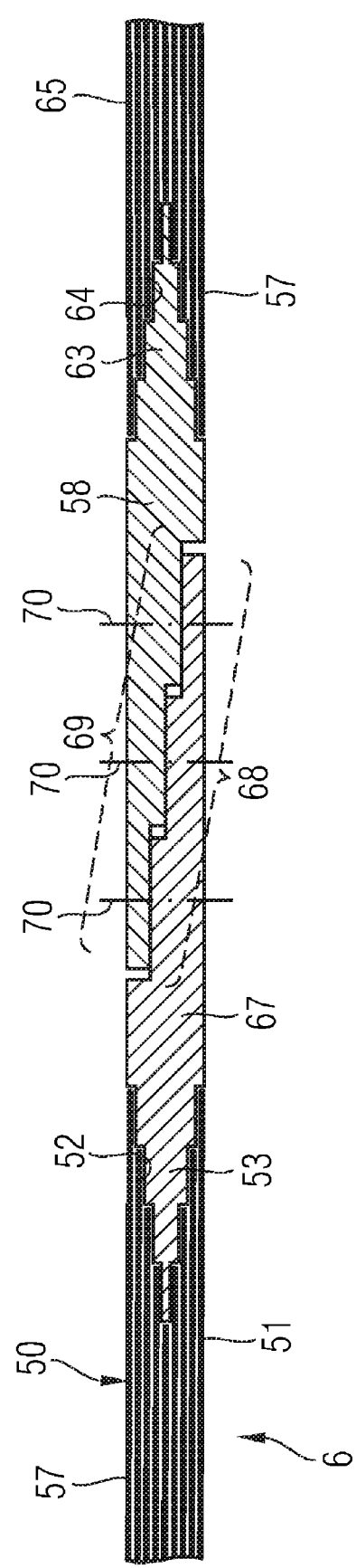

(B - B)

(C - C)

LAMINATE SHEET, IN PARTICULAR FOR FUSELAGE SKIN SHEETS FOR AIRCRAFTS

FIELD OF THE INVENTION

The invention relates to a laminate sheet, in particular for use as a skin sheet for an aircraft fuselage, comprising a large number of thin aluminium alloy sheets layered on top of one another, the aluminium alloy sheets each being adhesively bonded to one another preferably over their entire surface by an adhesive layer, and the adhesive layers each comprising at least one unidirectional fibreglass insert which is impregnated with a curable synthetic resin, in particular a curable epoxy resin.

The contents of U.S. Provisional Application No. 60/939,706 filed May 23, 2008, German patent application No. 10 2007 024 368.7 filed May 23, 2007 and German patent application No. 10 2007 046 478.0 filed Sep. 28, 2007 are herein included by cross-reference.

BACKGROUND OF THE INVENTION

In the modern aircraft construction industry, skin sheets made of "laminate sheets" (known as "GLARE®") are widely used for covering the fuselage. Such skin sheets are produced by layering thin aluminium sheets, which are adhesively bonded to one another with an adhesive layer, on top of one another. Each adhesive layer comprises at least one resin-impregnated, unidirectional fibreglass insert for mechanical reinforcement.

The entire laminate sheet construction, consisting of alternate layers of aluminium alloy sheets layered on top of one another and adhesive layers therebetween, is cured by using pressure and temperature in an autoclave or in a heatable press to form a laminate sheet. These laminate sheets are processed further in the same way as conventional aluminium alloy sheets. The adhesive layers, which ensure the cohesion between the aluminium alloy sheets, are preferably formed with fibreglass inserts which are impregnated or saturated with a curable epoxy resin and are each up to 0.5 mm thick. The aluminium alloy sheets are also up to 0.5 mm thick. The adhesive layers may also each comprise at least two fibreglass inserts with differing fibre flow directions. Alternatively, other types of fibre inserts (for example carbon fibres or aramide fibres) may be used in combination with other plastics materials such as polyester, BMI resins or thermoplastic polymers to form the adhesive layers.

Adhesively bonding the laminate layers together produces a mechanically highly loadable, plate-shaped laminate sheet which is highly resistant to fatigue and has a low crack propagation rate. In addition, the laminate sheet is characterised by a high resistance to impact.

At least two shell portions produced using laminate sheets of this type are generally connected along at least two longitudinal seams to produce the approximately barrel-shaped fuselage sections. Manufacturing half shells or quarter shells is conventional in fuselage shell production. Connecting the shell portions is generally carried out using the known riveting method or by forming overlapping longitudinal seams or butt welds with connecting butt straps arranged at the interior. A plurality of fuselage frame sections is subsequently connected by forming circumferential transverse seams to form a complete aircraft fuselage section.

Welding the laminate sheets, which is considerably less costly in comparison to the conventional riveting method, has not been possible up to now since the fibreglass inserts of the laminate sheets would contaminate the weld and, in addition, the high thermal load in the region of the weld may lead to delamination of the laminate sheet. Both of these effects result in a considerable reduction in the mechanical load-bearing capacity of the produced longitudinal seams.

SUMMARY OF THE INVENTION

The object of the invention is to produce a laminate sheet which can be connected using the known welding method, in particular the friction stir welding method with which an extremely high weld quality is achieved.

This object is achieved by a laminate sheet, in particular for use as a skin sheet for an aircraft fuselage, including a large number of thin aluminium alloy sheets layered on top of one another, each of the aluminium alloy sheets being adhesively bonded to one another at least in regions with an adhesive layer, and each of the adhesive layers having at least one unidirectional fiberglass insert, which is impregnated with a curable synthetic resin, in particular a curable epoxy resin, characterised in that the length of at least one aluminium alloy sheet differs in relation to at least one further aluminium alloy sheet in order to form an edge region, which is scarfed in a stepped manner at least in part, a longitudinal butt strap formed so as to correspond thereto being connected to the scarfed edge region by metal adhesive layers.

Due to the fact that the length of at least one aluminium alloy sheet differs in relation to at least one further aluminium alloy sheet in order to form an edge region which is scarfed in a stepped manner at least in part, wherein a longitudinal butt strap formed so as to correspond thereto is adhesively bonded to the scarfed edge region, the laminate sheets according to the invention can be joined together by conventional methods, in particular by the known friction stir welding method. The actual welding procedure is only carried out in the region of the longitudinal butt strap, which is preferably attached by an adhesive connection to the edge region which is scarfed in a stepped manner in such a way that the waste heat from welding substantially only occurs outside of the laminate sheet, which thus prevents the seam formation region from being contaminated by burning fibreglass inserts, which is detrimental to the strength of said weld, and/or prevents any temperature-related delamination taking place.

A close and mechanically high-strength bond between the laminate sheet and the weldable longitudinal butt strap is produced as a result of the stepped edge region of the laminate sheet and the contour corresponding thereto (as exact form closure as possible) of the longitudinal butt strap which is preferably adhesively bonded thereto. The longitudinal butt strap and the edge region fit in a substantially form-closed manner.

Preferably during the process of production of the laminate sheet and in particular before being pressed and thermally cured in an autoclave or in a heatable press, said longitudinal butt strap is adhesively bonded onto or into the at least one edge region which is formed so as to be "scarfed" in a stepped manner, i.e. the edge region of the laminate sheet extending obliquely in steps. The individual steps or offsets in the edge region of the laminate sheet are formed by the aluminium alloy sheets which are located on top of one another and are each "set back" by the depth of the step. The edge region may be shaped differently from the stepped form. For example, the aluminium alloy sheets layered on top of one another in the layer stack may be formed in such a way that they are each alternately longer and shorter.

In order to further increase the strength of the connection between the longitudinal butt strap attached by means of adhesive and the edge region of the laminate sheet, the longitudinal butt strap may comprise at least one projection or "nose" which is adhesively bonded between two layers of aluminium alloy sheets.

For attaching the at least one longitudinal butt strap to the scarfed edge region of the laminate sheet, the same synthetic resin or curable plastics material is preferably used which is also used to impregnate the glass fibre inserts in the adhesive layers of the laminate sheet. This is normally a curable epoxy resin.

For limiting the thermal load on the longitudinal butt strap, friction stir welding is preferably used to join the weldable laminate sheet according to the invention.

An advantageous embodiment of the laminate sheet provides that the longitudinal butt strap extends substantially over the entire scarfed edge region. This achieves a mechanically highly loadable connection between the laminate sheets, which are welded together along the longitudinal seams to form the fuselage skin. In principle, the longitudinal butt straps can be integrated on one, two, three or four longitudinal edges of the laminate sheet.

An embodiment of the invention provides that the longitudinal butt strap, which is configured to be integrated with the laminate sheet by means of adhesive bonding, is formed from an aluminium alloy material with a high degree of weldability.

The laminate sheet according to the invention can thus be easily welded with the preferably used friction stir welding method.

Further advantageous embodiments of the laminate sheet are presented in the further claims.

BRIEF DESCRIPTION OF THE DRAWINGS

In the drawings:

FIG. 3 shows two laminate sheets according to the invention joined by a friction stir weld, FIG. 4 shows the section A-A from FIG. 1, FIG. 5 shows a variant of the arrangement from FIG. 4.

DETAILED DESCRIPTION OF THE INVENTION

Figure 1:
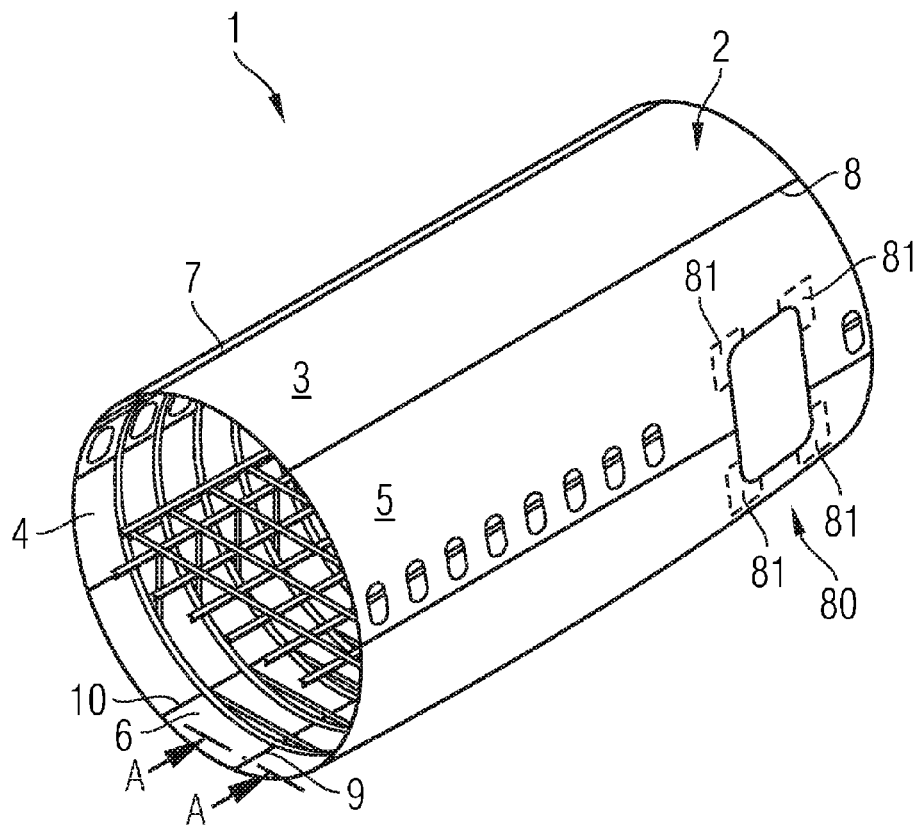
FIG. 1 is a perspective view of a barrel-shaped fuselage section.

In the drawings, like constructional elements each have like reference numerals.

FIG. 1 is a perspective view of a fuselage section.

The substantially barrel-shaped fuselage section 1 shown in FIG. 1 comprising a fuselage skin 2 is manufactured in what is known as the "four-shell construction method", in which an upper shell 3, two side shells 4, 5 and a lower shell 6 are continuously connected along four longitudinal seams 7 to 10 to form the fuselage section 1. If the shells are formed with an outer skin made of laminate sheets (so-called "Glare®"), the upper shell 3, the side shells 4, 5 and the lower shell 6 are connected by the conventional riveting method. By arranging a plurality of fuselage sections of this type one after another, a complete fuselage of an aircraft is formed, the fuselage sections each being connected to one another along circumferential transverse seams.

The laminate sheet formed according to the invention makes it possible for the first time, instead of the rivet method used to date, to use for instance the friction stir welding method, during manufacture of the fuselage sections to produce the longitudinal seams 7 to 10, which results in considerable savings in terms of time and costs. Friction stir welds are also less prone to fatigue crack formation which preferentially occurs in the inside region of the rivet holes in riveted seams. In addition, friction stir welds can be formed with relatively compact and lightweight installations, whereas spatially extensive and constructionally heavy machines are required for the automatic production of long rivet seams due to the high pressing and riveting forces which occur during riveting.

Figure 2:
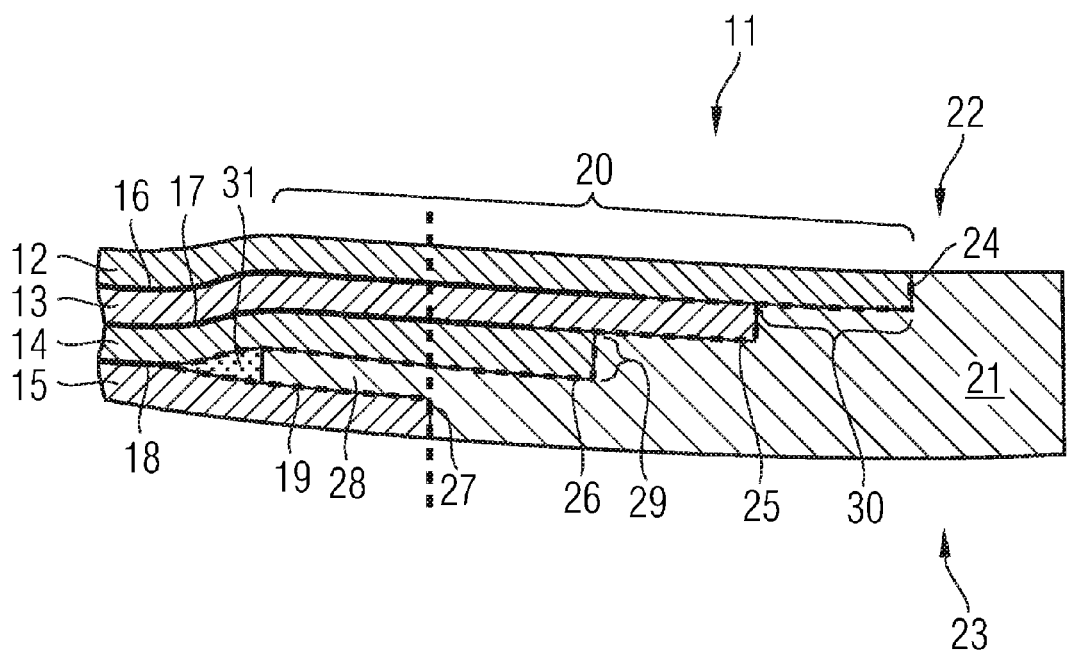
FIG. 2 is a cross-sectional view through an edge region of the laminate sheet according to the invention comprising an integrated longitudinal butt strap.

FIG. 2 is a schematic cross-sectional view of an edge region of a laminate sheet 11 according to the invention.

In the embodiment shown, the laminate sheet 11 is formed, inter alia, from four aluminium alloy sheets 12 to 15 which are layered on top of one another and are each of differing lengths. In the embodiment from FIG. 1 which is shown, the respective "length" of the aluminium alloy sheets 12 to 15—in relation to the vertical dotted artificial line—is reduced in a stepped manner from the upper aluminium alloy sheet 12 to the shortest aluminium alloy sheet 15. The aluminium alloy sheets 12 to 15 are preferably between 0.1 and 0.5 mm thick.

The aluminium alloy sheets 12 to 15 are adhesively bonded to one another by the adhesive layers 16 to 19 to form the laminate sheet 11. The adhesive layers 16 to 19 are formed by a layer of a fibreglass-reinforced and curable synthetic resin, in particular a curable epoxy resin. Each adhesive layer 16 to 19 comprises at least one fibreglass insert (not shown in greater detail), preferably extending unidirectionally, for mechanical reinforcement. If more than one unidirectional fibreglass insert is embedded in an adhesive layer 16 to 19, the fibres in the fibreglass inserts are preferably aligned in different directions. If necessary, the fibres can be aligned so as to follow a main flux direction.

According to the invention, the aluminium alloy sheets 12 to 15 are each shorter or greater in length, in an edge region 20 of the laminate sheet 11, in comparison to the adjacent aluminium alloy sheet, i.e. they have a different length in relation to the vertical dotted reference line in such a way that the edge region 20 has a "scarfed" contour, i.e. a contour which extends obliquely and in a pyramid-like and stepped manner. As exemplarily shown in FIG. 2, the dotted reference line extending vertically coincides with the not referenced edge of the aluminium alloy sheet 15. In principle, the aluminium alloy sheets 12 to 15 may form any conceivable contour in the edge region 20 by having differing lengths. A longitudinal butt strap 21 to be adhesively bonded with said edge region 20 has a surface contour formed so as to correspond thereto in such a way that the longitudinal butt strap 21 can be adhesively bonded to the scarfed edge region 20 of the laminate sheet 11 in a substantially form-closed manner. In this respect, the longitudinal butt strap 21 forms an integral component of the laminate sheet 11. The edge region 20 of the laminate sheet 11 with the integrated longitudinal butt strap 21 consequently has an upper side 22 or lower side 23 which is planar and virtually "seam-free" on both sides.

The longitudinal butt strap 21 is adhesively bonded, in the edge region 20, to the edge region 20 by the metal adhesive layers 24 to 27. The metal adhesive layers 24 to 27 shown in dotted lines are preferably formed from the same epoxy resin as the adhesive layers 16 to 19, but, in contrast to the adhesive layers 16 to 19, have no fibre reinforcement or fibre strengthening means. The metal adhesive layers 24 to 27 extend to a depth of 40 mm from the respective outer edges of the aluminium alloy sheets 12 to 15 into the laminate sheet 11.

The longitudinal butt strap 21 is formed monolithically from an aluminium alloy material with a preferably high level of weldability, that is to say the butt strap does not have a layer structure made with a plastics material-metal bond, in contrast to the laminate sheet 11. The metallurgical composition of the aluminium alloy material for the longitudinal butt strap 21 is preferably selected in such a way that it is suitable for all welding methods and in particular for the friction stir welding method. Provided that it has an appropriate level of weldability, the same alloy material used for the aluminium alloy sheets 12 to 15 can be used for the longitudinal butt strap 21.

The number of steps (in the embodiment shown the number is "four") in the longitudinal butt strap 21 generally corresponds to the number of aluminium alloy sheets 12 to 15 in the layer construction of the laminate sheet 11. The height 29 of respective steps in the longitudinal butt strap 21 depends substantially on the material thickness of the aluminium alloy sheets 12 to 15, optionally including the thickness of the adhesive layers 16 to 19. The depth 30 of the stepping of the longitudinal butt strap corresponds to the difference in length between two respective adjacent aluminium alloy sheets 12 to 15 of the laminate sheet 11. The longitudinal butt strap 21 preferably extends (perpendicular to the plane of projection) over the entire length of the edge region 20 or the length of the edge of the laminate sheet 11.

For further improvement of the mechanical interface between the edge region 20 of the laminate sheet 11 and the longitudinal butt strap 21, said butt strap may comprise at least one projection 28 or one nose which is adhesively bonded between the aluminium alloy sheets 14, 15 in the embodiment shown in FIG. 2. This can lead to a slight increase in thickness in the edge region 20 due to the corresponding material thickness of the projection 28.

In addition, due to the projection 28, it is necessary to fill a cavity, resulting from the ends of the aluminium alloy sheets 14, 15 being spread apart, with a wedge 31.

The wedge 31 is preferably formed from the same epoxy material which is used for the adhesive layers 16 to 19 and the metal adhesive layers 24 to 27. The wedge 31 can be formed by inserting an epoxy resin film before the laminate sheet is pressed.

A closer bond and a thus even stronger mechanically loadable connection between the edge region 20 and the longitudinal butt strap 21 is achieved due to the presence of the projection 28 which is "interlaced" or "interlocked" with the aluminium sheets 14, 15. If necessary, the longitudinal butt strap 21 may comprise a plurality of projections. The laminate sheet 11 according to the invention may be provided with an integrated longitudinal butt strap 21 according to the representation in FIG. 2 on one, two, three or four longitudinal edges.

FIG. 3 shows a longitudinal seam formed by means of friction stir welding between two laminate sheets according to the invention.

Two laminate sheets 32, 33 are each provided, in the edge regions 34, 35 thereof, with an integrated longitudinal butt strap 36, 37. The construction of the laminate sheets 32, 33 corresponds to the construction of the laminate sheet 11 described and shown in detail in FIG. 2. Due to the two integrated longitudinal butt straps 36, 37, it is possible to securely connect the two laminate sheets ("Glare®" plates) without difficulty with a conventional friction stir weld 38.

In this way, fuselage sections (cf FIG. 1) may be connected in a simple and advantageous manner with prefabricated shell components made of laminate sheets according to the invention by stir friction welded longitudinal seams. If the laminate sheets are provided on all sides with integrated longitudinal butt straps, a plurality of prefabricated fuselage sections can subsequently be connected by friction stir welded, circumferential transverse seams to form a complete aircraft fuselage.

The friction stir weldability of the laminate sheets according to the invention with friction stir welding allows for a high degree of automation of the fuselage production along with decreased production costs and a significantly improved seam quality in comparison to conventionally riveted skin sheets.

The laminate sheets 32, 33 may of course comprise carbon fibre plastics material (CFK) layers instead of the aluminium layers 12 to 15, wherein in this case the integrated longitudinal butt straps 36, 37 are preferably made of titanium or a titanium alloy, which are advantageous in conjunction with CFK for electrochemical reasons.

Moreover, it is of course possible to rivet the longitudinal butt straps 36, 37 to one another, irrespective of whether they are formed from titanium or a titanium alloy or aluminium or an aluminium alloy. For this purpose, the longitudinal butt straps 36, 37 preferably comprise stepped ends (see FIG. 5) which correspond to one another and which are riveted to one another to subsequently form a substantially smooth surface.

FIG. 4 shows the section A-A from FIG. 1. An end section 50 of the lower shell 6 comprises an aluminium laminate sheet 51 (for example "Glare®") which is provided with a scarfed end 52 formed from layers (one of the layers is provided with the reference numeral 57 by way of example) of differing length. A correspondingly scarfed end 53 of a titanium butt strap 54 (i.e. the invention also includes butt straps made of a titanium alloy) is adhesively bonded into the scarfed end 52. The correspondingly scarfed end 53 thus preferably tapers in a stepped manner from both sides to the centre plane 59 thereof. At its joint member 55 opposing the scarfed end 53, the titanium butt strap 54 is connected to a joint member 56 of a further titanium butt strap 58 by a weld 62. The weld 62 is preferably formed by friction stir or laser welding. Opposite the joint member 56, the titanium butt strap 58 comprises a scarfed end 63 which is adhesively bonded into a correspondingly scarfed end 64 of a CFK laminate 65. The CFK laminate 65 is thus a component of an end portion 66 of the side shell 9 (see also FIG. 1).

A fuselage section 1 can thus be produced with a lower shell 6 made of an aluminium laminate sheet 51 and side shells 4, 9 made of a CFK laminate 65. Since the aluminium laminate sheet 51 offers a considerably higher level of protection against fire compared to the CFK laminate 65 (in the case of a burning puddle of kerosene in the taxiing area, for example) and the CFK laminate 65 has higher strength in comparison to the aluminium laminate sheet 51, an overall optimised fuselage section 1 can thus be produced.

FIG. 5 shows a variant of the arrangement from FIG. 4. In the following only the differences between the arrangement of FIG. 5 and that of FIG. 4 will be discussed.

Instead of the titanium butt strap 54 (see FIG. 4), an aluminium butt strap 67 (see FIG. 5) which is provided with a step-shaped end portion 68, which replaces the joint member 55, is used. The titanium butt strap 58 comprises a corresponding step-shaped end portion 69 which is connected to the end portion 68 by rivets 70.

The advantage of the arrangement of FIG. 5 over that of FIG. 4 is that a cost-effective aluminium butt strap 67 can be used instead of the expensive titanium butt strap 53. Since aluminium and titanium (or the alloys thereof) are difficult to weld together, the connection between the butt straps 67 and 58 is preferably riveted in the arrangement in FIG. 5. Other fastening means, for example screws, are of course also conceivable.

Figure 6:
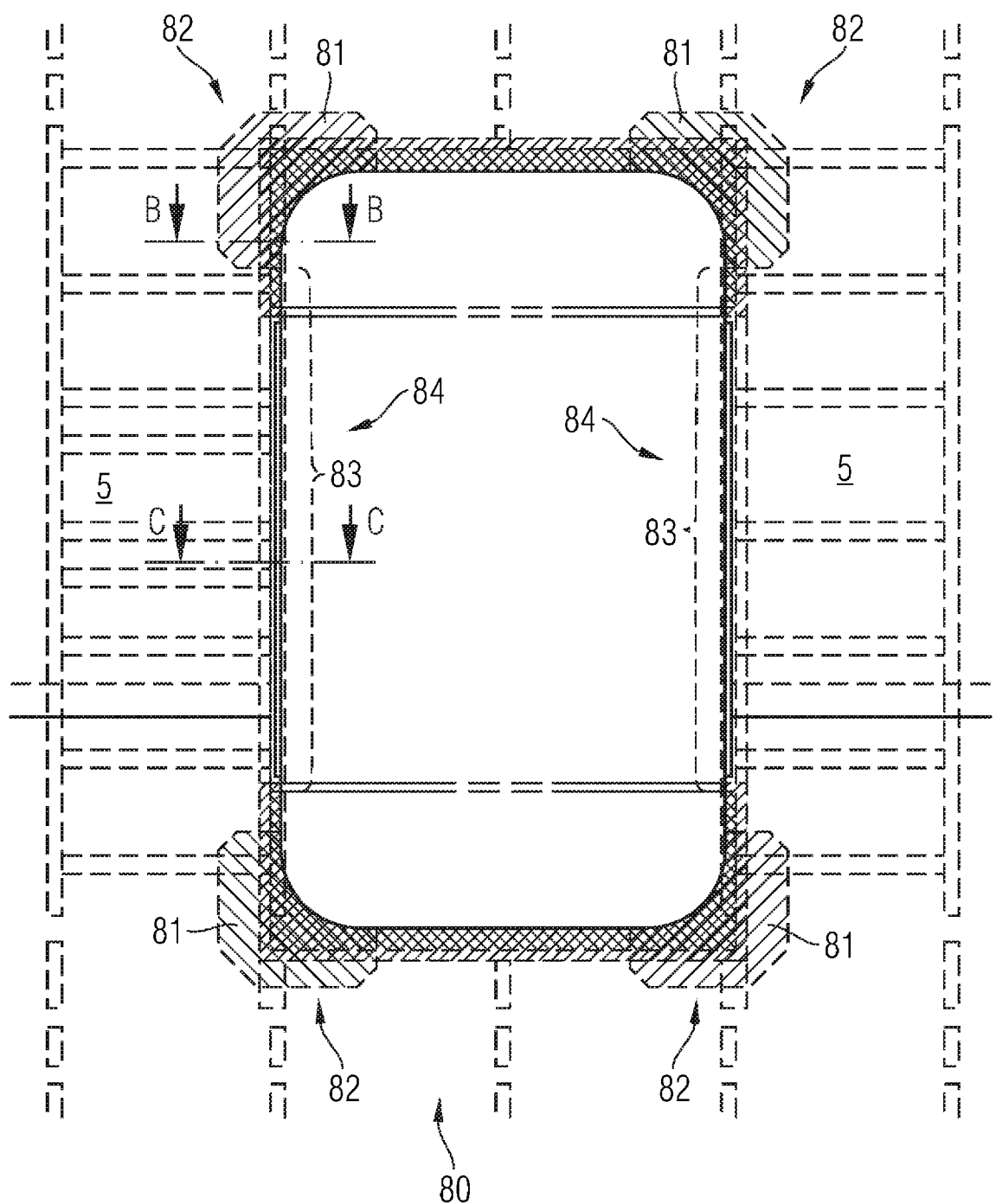
FIG. 6 shows a door cut-out opening from FIG. 1.

FIG. 6 shows a door cut-out opening 80 from FIG. 1, the side shell 5 being provided with corner doublers 81 in edge regions 82 of the door cut-out opening 80 and with edge protection means 83 in side regions 84.

Figure 7:
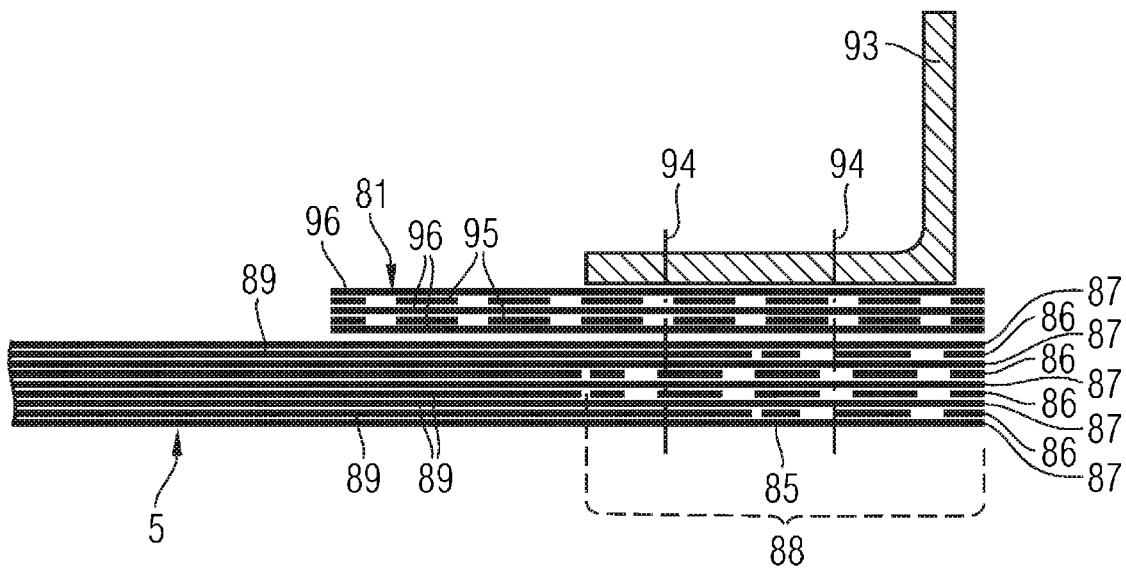
FIG. 7 shows a section B-B from FIG. 6.

FIG. 7 shows a section B-B from FIG. 6. The side shell 5 is formed from an aluminium laminate sheet or a titanium laminate sheet. If an aluminium laminate sheet is used, at the door cut-opening end 85 of the side shell 5 is reinforced with titanium butt straps 86. The titanium butt straps 86 thus replace ends of the aluminium sheets 89 and are arranged alternately with aluminium sheets 87, the length 88 of the titanium butt strap 86 decreasing from the interior towards the exterior.

At the interior, that is to say towards the centre of the fuselage, a corner doubler 81 is provided on the end 85 at the door cut-out opening, irrespective of whether the side shell 5 is formed from an aluminium laminate sheet or a titanium laminate sheet 96. The corner doubler 81 is preferably formed from an aluminium laminate sheet or a CFK laminate, said laminate being reinforced with titanium layers 95 between the aluminium or CFK layers.

A door frame bulkhead 93 is provided further towards the interior, the end 85 at the door cut-out opening and the corner doubler 81 being fastened to the door frame bulkhead 93 by rivets 94. The rivets 94 extend in this case through the layers 87, 86, 96 and 95.

This produces a door cut-out opening 80 with very stable corner regions 82.

Figure 8:
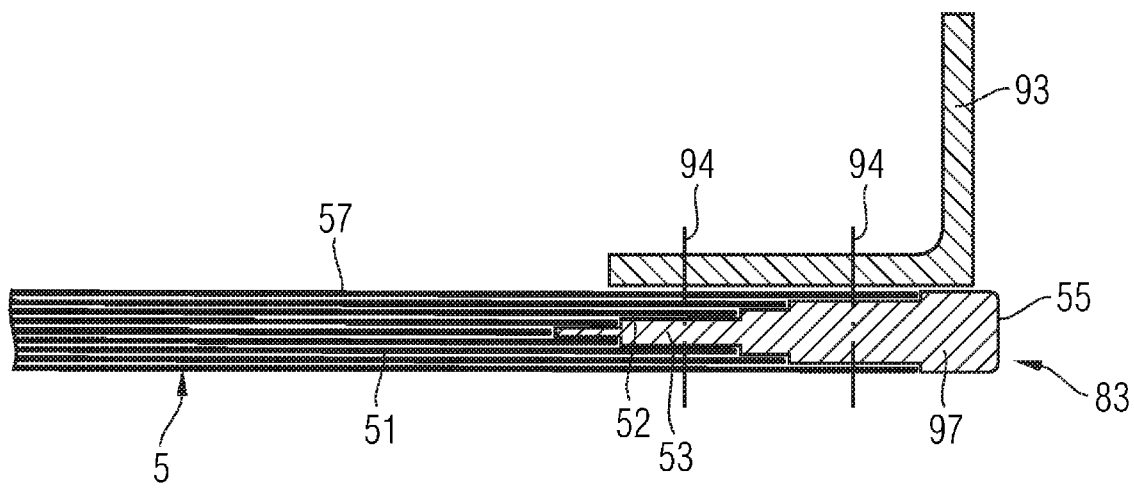
FIG. 8 shows a section C-C from FIG. 7.

In addition or as an alternative thereto, the door cut-out opening 80 can be provided with an edge protection means 83 which is illustrated in the section C-C from FIG. 6 shown in FIG. 8. The edge protection means 83 comprises an aluminium or titanium butt strap 97, which is fastened in an integrated manner to the side shell 5 in accordance with the example from FIG. 2 or 4. The side shell 5 is in this case formed from aluminium laminate sheet or CFK laminate. The butt strap 97 is fastened directly onto the door frame bulkhead 93 by means of rivets 94 which also preferably extend through at least one of the layers 57. Other fastening means, for example screws, may of course be used instead of the rivets 94.

The joint member 55 of the butt strap 97 provides an effective protection against baggage items, for example, which may accidentally strike the side region 83. Without the butt strap 97, the laminate in the side region 83 would sooner or later become damaged, possibly with dangerous consequences.

What claimed is:

1. Laminate sheet, in particular for use as a skin sheet for an aircraft fuselage, comprising a large number of thin aluminium alloy sheets layered on top of one another, each of the aluminium alloy sheets being adhesively bonded to one another at least in regions with an adhesive layer, and each of the adhesive layers having at least one unidirectional fiberglass insert, which is impregnated with a curable synthetic resin, wherein the length of at least one aluminium alloy sheet differs in relation to at least one further aluminium alloy sheet in order to form an edge region, which is scarfed in a stepped manner at least in part, wherein a longitudinal butt strap formed in a correspondingly stepped manner is connected to the scarfed edge region by metal adhesive layers wherein the longitudinal butt strap is formed from a monolithic aluminium alloy material.

2. Laminate sheet according to claim 1, wherein the longitudinal butt strap extends substantially over the entire length of the scarfed edge region.

3. Laminate sheet according to claim 1, wherein the longitudinal butt strap is connected to further components.

4. Laminate sheet according to claim 1, wherein the longitudinal butt strap comprises, at least in portions, at least one projection which is adhesively bonded between two aluminium alloy sheets whilst forming at least one wedge, in order to improve the mechanical bond between the longitudinal butt strap and the laminate sheet.

5. Laminate sheet according to claim 1, wherein the longitudinal butt strap is connected to the laminate sheet in a substantially seam-free and flush manner.

6. Laminate sheet according to claim 3, wherein the longitudinal butt strap is connected to at least one further laminate sheet by friction stir welding.

7. Laminate sheet according to claim 6, wherein the longitudinal butt strap is connected to the at least one further laminate sheet by friction stir welding to form an approximately barrel-shaped fuselage section of an aircraft by forming at least one longitudinal seam.

* * * * *